United States Patent
Okuda

(10) Patent No.: US 7,616,352 B2
(45) Date of Patent: Nov. 10, 2009

(54) DOCUMENT READING DEVICE WITH A CONTACT TYPE IMAGE SENSOR IN A READING UNIT MOUNTED ON A GUIDE SHAFT

(75) Inventor: Yasuyoshi Okuda, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 772 days.

(21) Appl. No.: 10/936,808

(22) Filed: Sep. 9, 2004

(65) Prior Publication Data

US 2005/0052710 A1  Mar. 10, 2005

(30) Foreign Application Priority Data

Sep. 9, 2003 (JP) ............................. 2003-316429

(51) Int. Cl.
  H04N 1/40 (2006.01)
  H04N 1/46 (2006.01)
(52) U.S. Cl. .................................... 358/474; 358/505
(58) Field of Classification Search ................ 358/474, 358/400, 471, 505; 347/129, 112, 111; D14/420, D14/356, 300, 453, 432
  See application file for complete search history.

(56) References Cited

U.S. PATENT DOCUMENTS

| | | | | |
|---|---|---|---|---|
| 4,075,888 A | * | 2/1978 | Buhler | 73/146 |
| 4,559,564 A | * | 12/1985 | Itoh et al. | 358/482 |
| 4,651,222 A | * | 3/1987 | Gokita | 358/410 |
| 4,798,963 A | * | 1/1989 | Wittkopp et al. | 250/559.22 |
| 4,831,458 A | * | 5/1989 | Watanabe | 358/443 |
| 5,015,837 A | * | 5/1991 | Hiroi et al. | 250/208.1 |
| 5,113,268 A | * | 5/1992 | Yoshida et al. | 358/474 |
| 5,206,745 A | * | 4/1993 | Yamada et al. | 358/498 |
| 5,208,874 A | * | 5/1993 | Omura | 382/274 |
| 5,448,055 A | * | 9/1995 | Nakamura et al. | 250/208.1 |
| 5,467,111 A | * | 11/1995 | Furukawa et al. | 346/134 |
| 5,875,376 A | * | 2/1999 | Chou | 399/211 |
| 5,926,290 A | * | 7/1999 | Chen et al. | 358/496 |

(Continued)

FOREIGN PATENT DOCUMENTS

JP  62-69771 A  3/1987

(Continued)

OTHER PUBLICATIONS

United States Patent Application Publication US 2002/0121590 A1; Yoshida et al; Image Reading Apparatus; Figures 1-6,9, 10, 17F, 20A, 20C, 23A, 23C,23D, 23F, 25A, 25C, 25F, 25F.*

(Continued)

Primary Examiner—Gabriel I Garcia
(74) Attorney, Agent, or Firm—Crowell & Moring LLP

(57) ABSTRACT

The document reading device includes a document table having a contact glass on which a document is placed, and a reading unit having a contact type image sensor which is contained in a case body and adapted to read the document which is positioned on the contact glass. The reading unit is positioned apart from the contact glass, and so designed as to conduct reading by scanning from a home position to a final reading position in a non-contact manner, and as to reciprocally move from the final reading position to the home position.

5 Claims, 3 Drawing Sheets

U.S. PATENT DOCUMENTS

| | | | | |
|---|---|---|---|---|
| 5,953,133 | A | * | 9/1999 | Fujimiya et al. ............ 358/474 |
| 6,050,471 | A | * | 4/2000 | Yagi ........................... 227/119 |
| 6,091,516 | A | * | 7/2000 | Chang et al. ................ 358/474 |
| 6,594,037 | B1 | * | 7/2003 | Takahashi ................... 358/474 |
| 2001/0043375 | A1 | * | 11/2001 | Yokota ....................... 358/497 |

FOREIGN PATENT DOCUMENTS

| | | |
|---|---|---|
| JP | 2000-115474 | 4/2000 |

OTHER PUBLICATIONS

United States Patent Application Publication US 2003/0123086 A1; Ishikawa; Multi-Function Peripheral; Figures 2A, 2B, 5A, 5B, 5C, 5D, 5E.*

United States Patent Application Publication US 2001/0040705 A1; Yokota; Image Reading Apparatus; Figures 2-7, 9, 11.*

Machine Translation of Japanese Published Patent Application No. 2000-115474; Detailed Description.*

Japanese Office Action dated Sep. 7, 2005 including English translation (Four (4) pages).

* cited by examiner

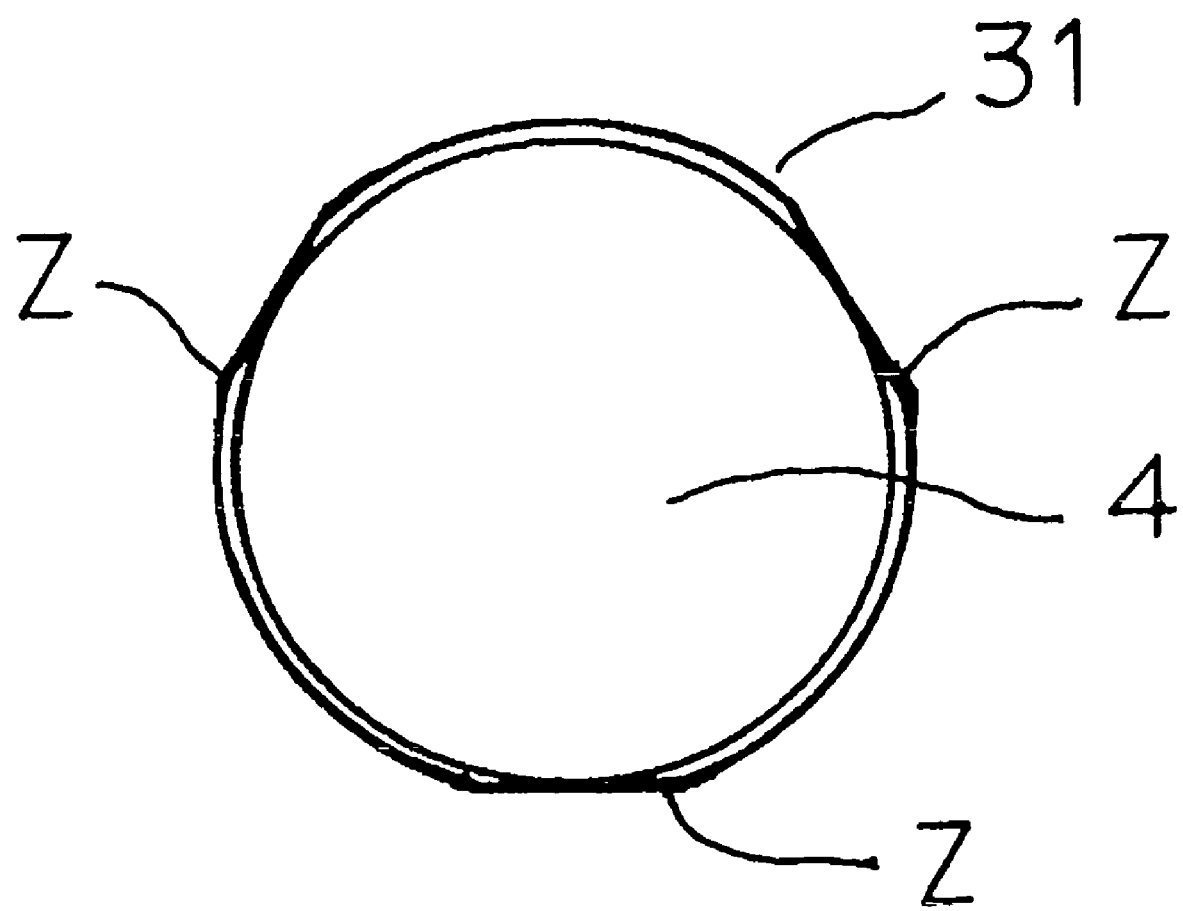

DOCUMENT READING DEVICE WITH A CONTACT TYPE IMAGE SENSOR IN A READING UNIT MOUNTED ON A GUIDE SHAFT

BACKGROUND OF THE INVENTION

1. Field of the Invention

The present invention relates to a document reading device such as a scanner which reads a document placed on a contact glass and converts it into digital data to be outputted to a computer, and more particularly, to the document reading device in which strange noises which a reading unit having a contact type image sensor (herein referred to simply as a CIS) may issue on contact with the contact glass, during scanning, can be effectively prevented.

2. Description of the Related Art

As publicly known, in the document reading device such as a scanner, a depth of focus is shallow. Therefore, reading by scanning is conducted in a state where a butting part of the CIS is kept in tight contact with a back face of the contact glass thereby to solve a problem of a focal length. However, because the butting part of the reading unit having the CIS frictionally slides on the back face of the contact glass, there will be generated such a drawback that a load may become large and strange noises may occur. Although a countermeasure of applying wax to the back face of the contact glass on which the butting part frictionally slides has been taken, the wax has been exhausted during the use, and it has been difficult for a user to recharge the wax, and hence, a long term use of the device has been unbearable. Besides, a wax applying work has been necessary in a production process.

In view of the above described problems, there has been a conventional document reading device including a reading unit which conducts scanning in contact with a contact glass thereby to read an image of a document placed on an opposite side through the contact glass, wherein the aforesaid reading unit is rotatably provided, and the reading unit is so adapted as to move in contact with the contact glass when the reading unit is moved in a direction of reading by scanning, and as to move apart from the contact glass when the reading unit is moved in an opposite direction to the direction of reading by scanning (See JP-A-2000-115474, for example).

However, in a structure disclosed in the above described JP-A-2000-115474 too, in order to read the image of the document, the reading unit is moved in tight contact with the contact glass, and so, there is a problem that the above described drawback cannot be essentially eliminated, though partially decreased.

SUMMARY OF THE INVENTION

The present invention has been made to solve the above described problem, and it is an object of the invention to provide a document reading device in which a reading unit is so designed as to move in a non-contact manner with respect to the contact glass, and such a drawback resulting from contact movements of the reading unit, as in the prior art, can be essentially eliminated.

In order to attain the above described object, according to the invention as claimed in claim 1, there is provided a document reading device comprising a document table having a contact glass on which a document is placed, a reading unit including a contact type image sensor which is contained in a case body and adapted to read the aforesaid document positioned on the aforesaid contact glass, and a guide shaft which is arranged in the aforesaid case body to guide movements of the aforesaid reading unit, characterized in that the aforesaid reading unit includes a chassis attached to a base which is mounted on the aforesaid guide shaft, and a contact type image sensor which is provided in the chassis, the contact type image sensor having its upper part kept in contact with a reference plane of the chassis by way of a positioning stopper, and being pushed upwardly by means of a compression spring provided in its lower part, wherein the aforesaid guide shaft is held at a determined length from a reading face of the document, while a length from the aforesaid guide shaft to the reference plane of the chassis is set so as to obtain an optimum focal length of the contact type image sensor with respect to the aforesaid document, and the aforesaid reading unit is positioned apart from the aforesaid contact glass, and adapted to conduct reading by scanning from a home position to a final reading position in a non-contact manner, and to reciprocally move from the final reading position to the home position.

According to the invention as claimed in claim 2, there is provided a document reading device comprising a document table having a contact glass on which a document is placed, and a reading unit including a contact type image sensor which is contained in a case body and adapted to read the aforesaid document positioned on the aforesaid contact glass, characterized in that the aforesaid reading unit is positioned apart from the aforesaid contact glass, and adapted to conduct reading by scanning from a home position to a final reading position in a non-contact manner, and to reciprocally move from the final reading position to the home position.

According to the invention as claimed in claim 3, the aforesaid base of the reading unit has a through hole whose inner peripheral face is in contact with the guide shaft at three points, as seen in a sectional view.

According to the invention as claimed in claim 3, the aforesaid base of the reading unit is formed in a divided structure so as to stride over the aforesaid guide shaft.

According to the structure of the invention described in claim 1, the CIS is pushed upwardly from the below by a force of the compression spring to the reference plane of the chassis of the reading unit mounted on the guide shaft which is held at a determined length from the reading face of the document. Therefore, a working distance of the CIS for reading by scanning can be restricted by way of the positioning stopper, and variations in the distance can be almost disregarded. At the same time, all the movements of the reading unit including the reading by scanning from the home position to the final reading position, and the return scanning from the final reading position to the home position, in other words, the reciprocal movements are conducted in a non-contact manner with respect to the contact glass. As the results, such a drawback that strange noises may occur with the movements in tight contact, as in the prior art, will be completely eliminated. In addition, because of the non-contact movements, there will be no need of applying wax to the back face of the contact glass, and so, it can be advantageously attained that workability in the production process will be improved, and the device can be used for a long time in a stable manner.

According to the structure of the invention described in claim 2, all the movements of the reading unit including the reading by scanning from the home position to the final reading position, and the return scanning from the final reading position to the home position are conducted in a non-contact manner with respect to the contact glass. As the results, such a drawback that strange noises may occur with the movements in tight contact, as in the prior art, will be completely eliminated. In addition, there will be no need of applying wax to the back face of the contact glass, and so, it can be advantageously attained that workability in the production process will be improved, and the device can be used for a long time in a stable manner.

According to the structure of the invention described in claim 3, because the contact is performed at the three points, the contact between the base and the guide shaft will be made extremely stable, and variations in the working distance of the CIS for reading by scanning can be reduced to the least, conveniently.

According to the structure of the invention described in claim 4, because the base of the reading unit has a divided structure, it would be advantageous that mounting work of the base to the guide shaft, and dimensional adjustments can be easily conducted.

BRIEF DESCRIPTION OF THE DRAWINGS

These and other objects and advantages of this invention will become more fully apparent from the following detailed description taken with the accompanying drawings in which:

FIG. 4 is a schematic view schematically showing, in an enlarged scale, an inner peripheral face of a through hole of a base and a guide shaft in a state fitted to each other.

DETAILED DESCRIPTION OF THE PREFERRED EMBODIMENTS

In a document reading device comprising a document table having a contact glass on which a document is placed, a reading unit including a contact type image sensor which is contained in a case body and adapted to read the aforesaid document positioned on the aforesaid contact glass, and a guide shaft which is arranged in the aforesaid case body to guide movements of the aforesaid reading unit, the aforesaid reading unit includes a chassis attached to a base which is mounted on the aforesaid guide shaft, and a contact type image sensor which is provided in the chassis, the contact type image sensor having its upper part kept in contact with a reference plane of the chassis by way of a positioning stopper, and being pushed upwardly by means of a compression spring provided in its lower part, wherein the aforesaid guide shaft is held at a determined length from a reading face of the document, while a length from the aforesaid guide shaft to the reference plane of the chassis is set so as to obtain an optimum focal length of the contact type image sensor with respect to the aforesaid document, and the aforesaid reading unit is positioned apart from the aforesaid contact glass, and adapted to conduct reading by scanning from a home position to a final reading position in a non-contact manner, and to reciprocally move from the final reading position to the home position. At the same time, the aforesaid base of the reading unit has a through hole whose inner peripheral face is in contact with the guide shaft at three points, as seen in a sectional view.

Figure 1:
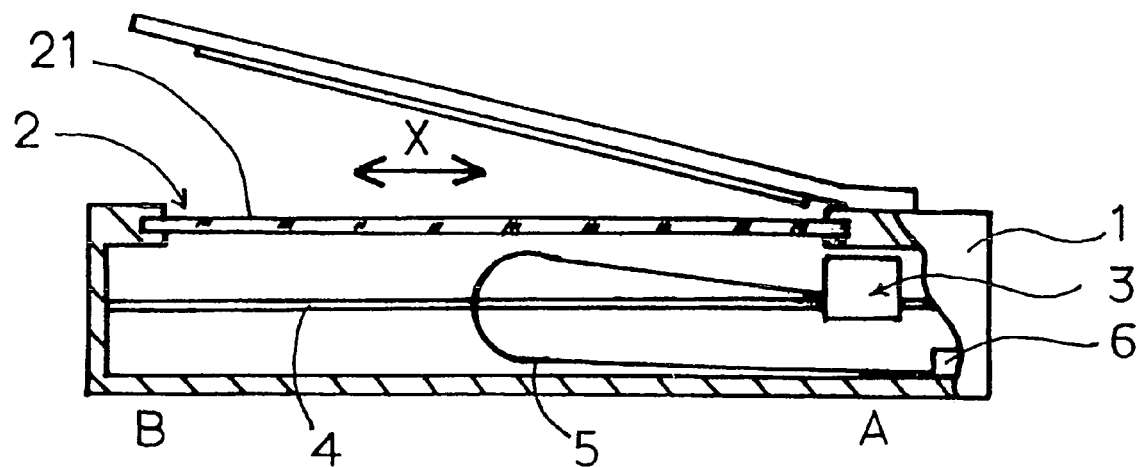
FIG. 1 is a view showing, partly in section, a schematic structure of a document reading device according to an embodiment of the invention.
Figure 2:
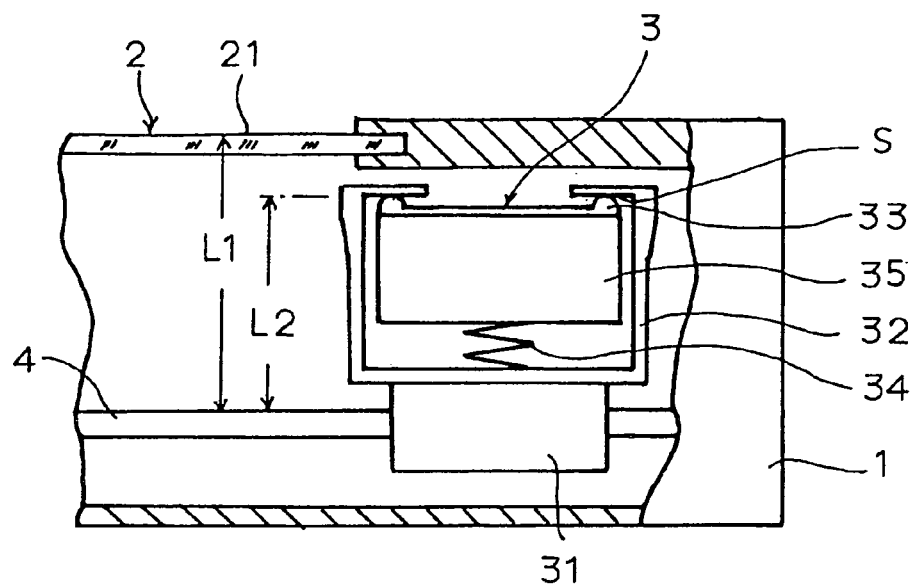
FIG. 2 is an enlarged sectional view showing an essential part of the document reading device as shown in FIG. 1.
Figure 3:
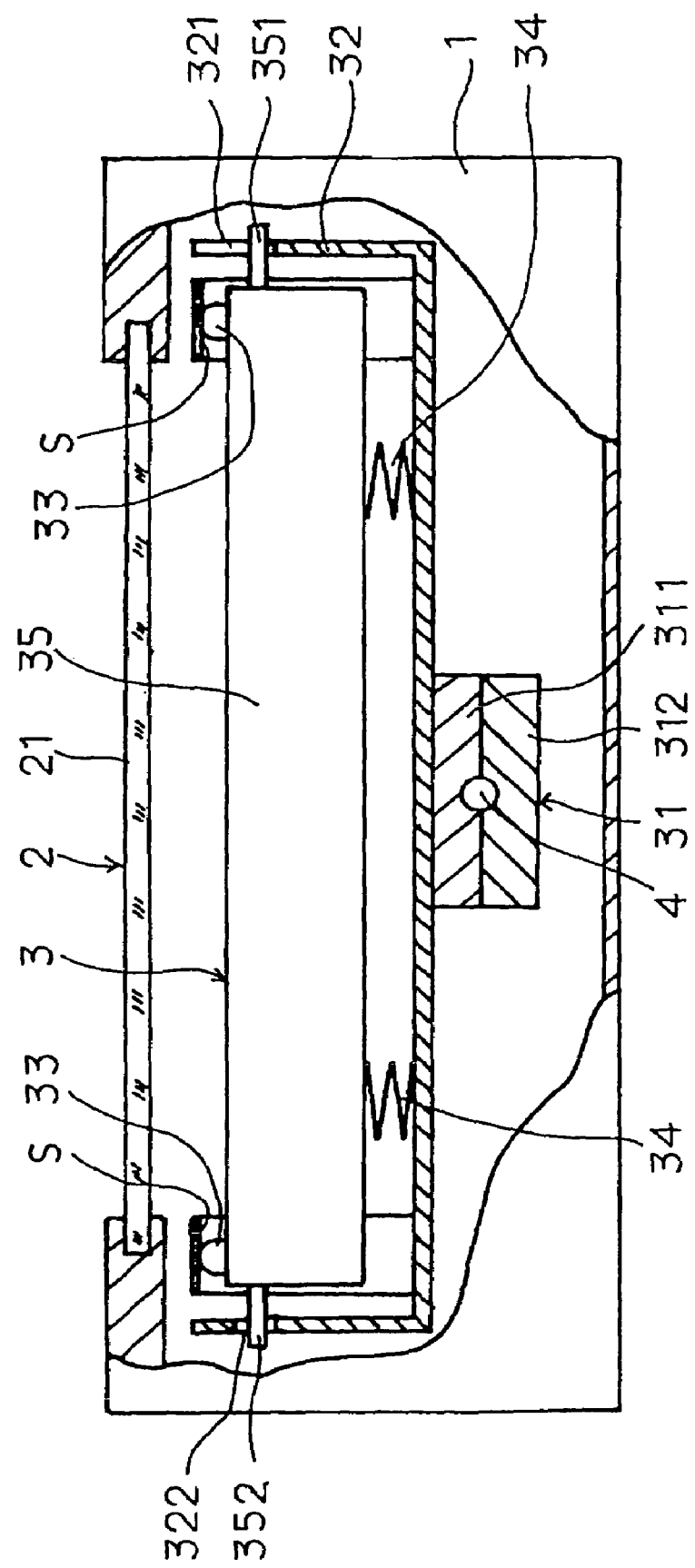
FIG. 3 is an enlarged side view showing, in section, the essential part of the document reading device as shown in FIG. 1.

Now, an embodiment of the invention will be described referring to FIGS. 1 to 4. FIG. 1 is a view showing, partly in section, a schematic structure of a document reading device according to the embodiment of the invention, FIG. 2 is an enlarged sectional view showing an essential part of the document reading device as shown in FIG. 1, FIG. 3 is an enlarged side view showing, in section, the essential part of the document reading device as shown in FIG. 1, and FIG. 4 is a schematic view schematically showing, in an enlarged scale, an inner peripheral face of a through hole of a base and a guide shaft in a state fitted to each other.

Numeral 1 is a case body, and a document table 2 having a contact glass 21 on which a document which is not shown is placed is formed on an upper face of the case body 1. Numeral 3 is a reading unit which is arranged inside the case body 1. The reading unit 3 is guided by a guide shaft 4 to reciprocally move, as shown by an arrow mark X, below the contact glass 21 by means of a driving unit including a driving source and a transferring mechanism which are not shown, and reads the document by scanning, while it moves from a home position A to a final reading position B.

Numeral 5 is a flexible flat cable which is used for supplying an electric power to LEDs of the reading unit 3 and for transmitting and controlling reading signals. The flexible flat cable 5 connects the reading unit 3 to a connector 6 which is provided in the aforesaid case body 1.

According to the invention, the aforesaid reading unit 3 includes a chassis 32 made of metal, for example, which is attached to a base 31 mounted on the aforesaid guide shaft 4, and a CIS 35 whose upper part is kept in contact with a reference plane S of the chassis 32 by way of positioning stoppers 33 made of synthetic resin, for example. The CIS 35 is pushed upwardly by means of compression springs 34 which are provided on its lower face.

The aforesaid guide shaft 4 is held at a determined length L1 from a reading face of the document, and a length L2 from the aforesaid guide shaft 4 to the reference plane S of the chassis 32 is set so as to obtain an optimum focal length of the CIS 35 with respect to the aforesaid document. The reading unit 3 is positioned apart from the contact glass 21, and so designed as to conduct reading by scanning from the home position A to the final reading position B in a non-contact manner, and as to reciprocally move between the final reading position B and the home position A.

The aforesaid CIS 35 includes the LEDs of three colors (Red, Green and Blue), for example, which are light sources for irradiating the document, which is not shown, a rod lens array which forms an image of reflecting light from the document on light receiving elements of an image sensor, the image sensor, and so on which are contained in a frame body. Support shafts 351, 352 provided at both ends of the frame body are respectively passed through a support part 321 in a U-shape and a support part 322 in a shape of an elongated hole which are provided at both ends of the aforesaid chassis 32. In this manner, the CIS is prevented from being displaced from a determined position or broken by vibrations which may occur on occasion of transporting the document reading device of this type.

The aforesaid base 31 is formed of synthetic resin such as polypropylene which has a low coefficient of friction and is liable to slip. An inner peripheral face of a through hole of this base 31 may be machined so as to have straight lines Z in parts at three positions, as shown in FIG. 4, so that the inner peripheral face of the through hole may come into contact with the guide shaft 4 at three points, as seen in a sectional view. By this three points contact, the contact between the base 31 and the guide shaft 4 will be made extremely stable. As the results, it is possible to reduce variations in a working distance of the CIS 35 for reading by scanning to the least, conveniently.

Moreover, the base 31 of the aforesaid reading unit 3 may have a divided structure which is divided into base pieces 311 and 312. Being constructed in such a manner that the chassis 32 is first attached to the base piece 311, then, the base piece 311 is mounted so as to stride over the aforesaid guide shaft 4, and thereafter, the lower base piece 312 is secured by means of a fastening member such as a bolt which is not shown, it would be advantageous that mounting work of the aforesaid reading unit 3 to the guide shaft 4, and dimensional adjustments can be easily conducted.

In the embodiment having the above described structure, the CIS 35 is pushed from the below upwardly by a force of the compression spring to the reference plane S of the chassis 32 of the reading unit 3 mounted on the guide shaft 4 which is held at a determined length from the reading face of the document. Therefore, the working distance of the CIS 35 for reading by scanning can be restricted by way of the positioning stoppers 33, and variations in the distance can be almost disregarded. At the same time, all the movements of the reading unit 3 including the reading by scanning from the home position A to the final reading position B, and the return scanning from the final reading position B to the home position A, in other words, the reciprocal movements are conducted in a non-contact manner with respect to the contact glass 21. As the results, such a drawback that strange noises may occur with the movements in tight contact, as in the prior art, will be completely eliminated. In addition, because of the non-contact movements, there will be no need of applying wax to the back face of the contact glass 21, and so, it can be advantageously attained that workability in the production process will be improved, and the device can be used for a long time in a stable manner.

It is to be noted that although the above described embodiment is a preferable embodiment of the invention, the invention is not limited to this embodiment, but various modifications can be made within a scope not deviating from a gist of the invention.

What is claimed is:

1. A document reading device comprising:
   a document table having a contact glass on which a document is placed;
   a reading unit including a contact type image sensor which is contained in a case body and adapted to read said document positioned on said contact glass, and
   a guide shaft which is arranged in said case body to guide movements of said reading unit, wherein:
   said reading unit includes a chassis attached to a base which is mounted on said guide shaft, and a contact type image sensor which is provided in said chassis, said contact type image sensor having its upper part kept in contact with a reference plane of the chassis by way of a positioning stopper, and being pushed upwardly by means of a compression spring provided in its lower part;
   said guide shaft is held at a determined length from a reading face of the document, while a length from said guide shaft to said reference plane of the chassis is set so as to obtain an optimum focal length of the contact type image sensor with respect to said document, and said reading unit is positioned apart from said contact glass, and adapted to conduct reading by scanning from a home position to a final reading position in a non-contact manner, and to reciprocally move from the final reading position to the home position; and
   said base of said reading unit has a through hole whose inner peripheral face is in contact with said guide shaft at three points, as seen in a sectional view.

2. A document reading device according to claim 1, wherein
   said base of said reading unit is formed in a divided structure so as to stride over said guide shaft.

3. The document reading device according to claim 2, wherein the image sensor has protrusions being in contact with the inner face of the chassis.

4. A document reading device comprising:
   a document table having a contact glass on which a document is placed; and
   a reading unit including a contact type image sensor adapted to perform reading of said document placed on said contact glass and a chassis mounted on a guide shaft containing the image sensor, the reading unit being configured to be moveable on the guide shaft between a home position and a final reading position so that the reading is performed when the reading unit is moved from the home position to the final reading position, and is moved back from the final reading position to the home position when the reading is finished, wherein
   said reading unit is spaced apart from said contact glass whenever the said reading unit is moved between the home position and the final reading position, and
   the contact type image sensor contained in the chassis has an upper part kept in contact with a reference plane of the chassis by a positioning stopper.

5. The document reading device according to claim 4, further comprising an elastic member for pressing the image sensor against an inner face of the chassis.

* * * * *

UNITED STATES PATENT AND TRADEMARK OFFICE
CERTIFICATE OF CORRECTION

| | | |
|---|---|---|
| PATENT NO. | : 7,616,352 B2 | Page 1 of 1 |
| APPLICATION NO. | : 10/936808 | |
| DATED | : November 10, 2009 | |
| INVENTOR(S) | : Yasuyoshi Okuda | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1090 days.

Signed and Sealed this

Fourteenth Day of December, 2010

David J. Kappos
*Director of the United States Patent and Trademark Office*